US011341269B2

(12) United States Patent
Veugen

(10) Patent No.: US 11,341,269 B2
(45) Date of Patent: May 24, 2022

(54) PROVIDING SECURITY AGAINST USER COLLUSION IN DATA ANALYTICS USING RANDOM GROUP SELECTION

(71) Applicant: Flytxt B.V., Nieuwegein (NL)

(72) Inventor: Thijs Veugen, The Hague (NL)

(73) Assignee: FLYTXT B.V., Nieuwegein (NL)

( * ) Notice: Subject to any disclaimer, the term of this patent is extended or adjusted under 35 U.S.C. 154(b) by 331 days.

(21) Appl. No.: 16/235,514

(22) Filed: Dec. 28, 2018

(65) Prior Publication Data

US 2019/0205568 A1 Jul. 4, 2019

(30) Foreign Application Priority Data

Dec. 28, 2017 (EP) .................................. 17210886.2

(51) Int. Cl.
*G06F 21/62* (2013.01)
*H04L 9/08* (2006.01)
(Continued)

(52) U.S. Cl.
CPC .......... *G06F 21/6254* (2013.01); *G06F 7/723* (2013.01); *G06F 21/6209* (2013.01);
(Continued)

(58) Field of Classification Search
CPC .... G06F 21/6254; G06F 21/602; G06F 7/723; G06F 21/6209; G06F 2221/2125;
(Continued)

(56) References Cited

U.S. PATENT DOCUMENTS 8,555,400 B2 * 10/2013 Shi .................... H04L 9/0833
380/278
8,565,435 B2 * 10/2013 Gentry .................. H04L 9/0816
713/171
(Continued)

FOREIGN PATENT DOCUMENTS

WO 2013066176 A1 5/2013
WO 2013066177 A1 5/2013

OTHER PUBLICATIONS

Erkin, Z., Veugen, T., Toft, T. et al. Privacy-preserving distributed clustering. EURASIP J. on Info. Security 2013, 4 (2013). https://doi.org/10.1186/1687-417X-2013-4.*
(Continued)

*Primary Examiner* — David Garcia Cervetti
(74) *Attorney, Agent, or Firm* — Steven M. Koehler; Westman, Champlin & Koehler, P.A.

(57) ABSTRACT

Methods for secure random selection of t client devices from a set of N client devices and methods for secure computation of inputs of t client devices randomly selected from N client devices are described. Such random selection method may include determining an initial binary vector b of weight t by setting the first t bits to one: $b_i=1$, $1 \leq i \leq t$, and all further bits to zero: $b_i=0$, $t<i \leq N$; each client device i ($i=1, \ldots, N$) of the set of N client devices jointly generating a random binary vector b of weight t in an obfuscated domain on the basis of the initial binary vector b including: determining a position n in the binary vector; determining a random number r in $\{n, n+1, \ldots N\}$; and, using the random number to swap binary values at positions n and r of the binary vector b.

19 Claims, 6 Drawing Sheets

(51) Int. Cl.
*H04L 9/00* (2022.01)
*G06F 7/72* (2006.01)

(52) U.S. Cl.
CPC .............. *H04L 9/008* (2013.01); *H04L 9/085* (2013.01); *G06F 2221/2125* (2013.01); *H04L 2209/16* (2013.01); *H04L 2209/46* (2013.01)

(58) Field of Classification Search
CPC ......... G06F 7/588; H04L 9/0891; H04L 9/30; H04L 2209/42; H04L 9/008; H04L 9/0838; H04L 9/0869; H04L 2209/24; H04L 9/085; H04L 2209/46; H04L 9/3093; H04L 9/0861; H04L 9/0894; H04L 9/3066; H04L 9/3218; H04L 2209/805; H04L 2209/08; H04L 2209/16; H04L 9/0662; H04L 9/0618; H04L 9/14; H04L 9/3073; H04L 9/3271
See application file for complete search history.

(56) References Cited

U.S. PATENT DOCUMENTS

| | | | | |
|---|---|---|---|---|
| 8,627,107 | B1* | 1/2014 | Kennedy | G06F 21/62 713/150 |
| 8,627,488 | B2* | 1/2014 | Cormode | G06F 21/6254 726/28 |
| 8,909,711 | B1* | 12/2014 | Staddon | G06Q 50/01 709/204 |
| 9,083,526 | B2* | 7/2015 | Gentry | H04L 9/008 |
| 9,281,941 | B2* | 3/2016 | Gentry | H04L 63/0442 |
| 9,436,835 | B1* | 9/2016 | Saldamli | G06F 21/602 |
| 9,536,114 | B1* | 1/2017 | El Defrawy | H04L 9/085 |
| 9,558,359 | B1* | 1/2017 | El Defrawy | G06F 21/6263 |
| 9,660,803 | B2* | 5/2017 | Chalker | H04L 9/0872 |
| 9,660,813 | B1* | 5/2017 | van Dijk | H04L 63/0853 |
| 10,015,007 | B2* | 7/2018 | Bacon | H04L 9/008 |
| 10,069,631 | B2* | 9/2018 | Rane | H04L 9/085 |
| 10,095,880 | B2* | 10/2018 | Bent | H04L 9/14 |
| 10,333,696 | B2* | 6/2019 | Ahmed | H04L 9/006 |
| 10,644,876 | B2* | 5/2020 | Williams | H04L 9/302 |
| 10,771,237 | B2* | 9/2020 | Williams | G06F 16/3344 |
| 10,873,568 | B2* | 12/2020 | Williams | H04L 9/3226 |
| 10,880,275 | B2* | 12/2020 | Williams | G09C 1/00 |
| 11,048,819 | B2* | 6/2021 | Pihur | G06F 17/18 |
| 2003/0204742 | A1* | 10/2003 | Gupta | H04L 67/104 726/22 |
| 2008/0219194 | A1* | 9/2008 | Kim | H04B 7/0617 370/310 |
| 2009/0282039 | A1* | 11/2009 | Diamond | H04L 9/3066 |
| 2009/0327141 | A1* | 12/2009 | Rabin | H04L 9/3218 708/250 |
| 2011/0040820 | A1* | 2/2011 | Rane | G06F 7/5443 708/441 |
| 2011/0283099 | A1* | 11/2011 | Nath | H04L 9/008 708/405 |
| 2012/0106738 | A1* | 5/2012 | Belenkiy | H04L 9/14 380/270 |
| 2013/0035979 | A1* | 2/2013 | Tenbrock | G06Q 30/02 705/7.29 |
| 2014/0184803 | A1* | 7/2014 | Chu | G06T 7/292 348/159 |
| 2015/0100785 | A1* | 4/2015 | Joye | H04L 9/008 713/168 |
| 2015/0154406 | A1* | 6/2015 | Naehrig | G16B 50/00 713/165 |
| 2015/0229480 | A1* | 8/2015 | Joye | H04L 9/3255 713/176 |
| 2015/0312028 | A1* | 10/2015 | Cheon | H04L 9/008 713/189 |
| 2016/0149866 | A1* | 5/2016 | Dolev | H04L 63/0414 726/30 |
| 2016/0170996 | A1* | 6/2016 | Frank | G06F 16/24575 707/748 |
| 2016/0224803 | A1* | 8/2016 | Frank | G06F 21/6245 |
| 2016/0300252 | A1* | 10/2016 | Frank | G06F 16/24578 |
| 2016/0335440 | A1* | 11/2016 | Clark | H04L 9/085 |
| 2017/0220817 | A1* | 8/2017 | Shen | H04L 63/1475 |
| 2017/0222798 | A1* | 8/2017 | Morel | H04L 9/3231 |
| 2017/0279616 | A1* | 9/2017 | Loeb | H04L 9/0643 |
| 2017/0293772 | A1* | 10/2017 | Chen | G06F 21/32 |
| 2017/0329643 | A1* | 11/2017 | Wang | H04L 29/06 |
| 2017/0372226 | A1* | 12/2017 | Costa | G06F 21/60 |
| 2018/0034654 | A1* | 2/2018 | Mumme | H04W 12/02 |
| 2018/0101697 | A1* | 4/2018 | Rane | H04L 9/085 |
| 2018/0157703 | A1* | 6/2018 | Wang | G06F 16/2453 |
| 2018/0199361 | A1* | 7/2018 | Zhang | H04L 5/0033 |
| 2018/0203926 | A1* | 7/2018 | Phan | H04L 43/10 |
| 2018/0373882 | A1* | 12/2018 | Veugen | H04L 9/0869 |
| 2019/0190694 | A1* | 6/2019 | Joye | H04L 9/14 |
| 2019/0289620 | A1* | 9/2019 | Zhang | H04W 72/1242 |
| 2019/0335512 | A1* | 10/2019 | Shi | H04W 74/0833 |
| 2020/0068616 | A1* | 2/2020 | Qian | H04L 5/0053 |

OTHER PUBLICATIONS

Z. Erkin, T. Veugen, T. Toft and R. L. Lagendijk, "Generating Private Recommendations Efficiently Using Homomorphic Encryption and Data Packing," in IEEE Transactions on Information Forensics and Security, vol. 7, No. 3, pp. 1053-1066, Jun. 2012, doi: 10.1109/TIFS.2012.2190726.*

Z. Erkin, T. Veugen, T. Toft and R. L. Lagendijk, "Privacy-preserving user clustering in a social network," 2009 First IEEE International Workshop on Information Forensics and Security (WIFS), London, 2009, pp. 96-100, doi: 10.1109/WIFS.2009. 5386476.*

T. Veugen, R. de Haan, R. Cramer and F. Muller, "A Framework for Secure Computations With Two Non-Colluding Servers and Multiple Clients, Applied to Recommendations," in IEEE Transactions on Information Forensics and Security, vol. 10, No. 3, pp. 445-457, Mar. 2015, doi: 10.1109/TIFS.2014.2370255.*

Z. Erkin, T. Veugen and R. L. Lagendijk, "Privacy-preserving recommender systems in dynamic environments," 2013 IEEE International Workshop on Information Forensics and Security (WIFS), Guangzhou, 2013, pp. 61-66, doi: 10.1109/WIFS.2013.6707795.*

D Kononchuk, Z Erkin, JCA van der Lubbe, RL Lagendijk, Privacy-preserving user data oriented services for groups with dynamic participation, in Computer Security—ESORICS 2013, Lecture Notes in Computer Science, vol. 8134 (Springer, Berlin, 2013), pp. 418-442.*

Anselm et al., Unsupervised learning of invariant representations with low sample complexity: the magic of sensory cortex or a new framework for machine learning.

Damgard et al., "Unconditionally secure constant-rounds multi-party computation for equality, comparison, bits and exponentiation", In: Halevi, S., Rabin, T. (eds.) TCC 2006, LNCS, vol. 3876, pp. 285-304. Springer, Heidelberg.

Desmedt and Y. Frankel, "Threshold cryptosystems", CRYPTO 1989, p. 308-315, Springer-Verlag.

Erkin, et al, "Generating private recommendations efficiently using homomorphic encryption and data packing", IEEE Trans. Inform. Forensics Secur. 7(3), 1053-1066, 2012.

Erkin et al., in IEEE International Workshop on Information Forensics and Security, "Privacy-preserving user clustering in a social network", IEEE, Washington, 2009.

Extended European Search Report issued in corresponding European Application No. 17210886.2, dated Sep. 13, 2018.

HEAP, "Permutations by Interchanges", Computer Journal., vol. 6, No. 3, Nov. 1, 1963 (Nov. 1, 1963), pp. 293-298.

Kargupta et al., in ICDM, IEEE Computer Society, "On the privacy preserving properties of random data perturbation techniques", IEEE, Washington, 2003, pp. 99-106.

Kacprzyk, "Group decision making with a fuzzy linguistic majority", Fuzzy Sets Syst, 18, 105-118, 1986.

Kononchuk Dmitry et al., "Privacy-Preserving User Data Oriented Services for Groups with Dynamic Participation", (Sep. 9, 2013), Medical Image Computing and ComputerAssisted Intervention—

(56) References Cited

OTHER PUBLICATIONS

MIGCAI 2015 : 18th International Conference, Munich, Germany, Oct. 5-9, 2015; Proceedings [Lecture Notes in Computer Science; Lect.Notes Computer], Springer International Publishing, CH.

Veugen et al., "Improved privacy of dynamic group services", EURASIP Journal on Information Security, Biomed Central Ltd, London, Uk, vol. 2017, No. 1, (Feb. 1, 2017), pp. 1-9.

Mathes, Folksonomies "Cooperative classification and communication through shared metadata", Comput. Mediated Commun. 47, 1-28, 2004). nr. 10.

F Anselmi et al., "Unsupervised learning of invariant representations with 35 low sample complexity: the magic of sensory cortex or a new framework for machine learning?" Theor. Comput. Sci. 633(C), 112-121 (2016). CBMM, MIT, arXiv:1311.4158v5), Collective decision-making.

B. Schoenmakers and P. Tuyls, "Practical Two-Party Computation based on Conditional Gate," ASIACRYPT 2004, Lecture Notes in Computer Science 3329 (2004) 119136.

Ivan Damgard et al., "A Generalisation, a Simplication and Some Applications of Pailler's Probabilistic Public-Key System" In: "Lecture Notes in Computer Science", Jun. 5, 2001 (Jun. 5, 2001), Springer Berlin Heidelbergg, Berlin, Heidelberg, XP055148869, ISSN: 0302-97-42; ISBN: 978-3-54-045234-0, vol. 1992, pp. 119-136.

European Search Report and Written Opinion for European Patent Application No. EP 17177653, filed Jun. 23, 2017, dated Jan. 9, 2018.

Fuyou Miao et al., "Randomized Component and Its Application to (t, m, n)—Group Oriented Secret Sharing", IEEE Transactions on Information Forensics and Security, IEEE, Piscataway, NJ, US, vol. 10, No. 5, May 1, 2015 (May 1, 2015), pp. 889-899, XP011577142, ISSN: 1556-6013.

Desmedt Y et al.: "Threshold Cryptosystems", Advances in Cryptology. Santa Barbara, Aug. 20-24, 1989 [Proceedings of the Conference on Theory and Applications of Cryptology], New York, Pringer, US, vol. 435, Aug. 20, 1989 (Aug. 20, 1989), pp. 307-315, XP002295910.

Parno et al., "Pinocchio: Nearly Practical Verifiable Computation", Communications of the ACM (2016) vol. 59 Issue 2: 103-112.

Catalano et al., "Homomorphic Signatures with Efficient Verification for Polynomial Functions", J.A. Garay and R. Gennaro (Eds): CRYPTO 2014, Part I, LNCS 8616: 371-389, International Association for Cryptologic Research, 2014.

* cited by examiner

PROVIDING SECURITY AGAINST USER COLLUSION IN DATA ANALYTICS USING RANDOM GROUP SELECTION

The discussion below is merely provided for general background information and is not intended to be used as an aid in determining the scope of the claimed subject matter.

FIELD OF THE INVENTION

Aspects of the invention relate to providing security against user collusion in data analytics using random group selection, and, in particular, though not exclusively, to methods and systems for random group selection, methods and system for secure computation of inputs using random group selection, client devices and server devices adapted to execute such methods and a computer program product adapted to execute such methods.

BACKGROUND OF THE INVENTION

Currently the number of data processing schemes that require the processing of large sets of privacy-sensitive data is growing exponentially. Commercial, governmental and academic organizations make decisions or verify or disprove models, theories or hypotheses using big data analytics. These techniques generally include collecting, organizing and analysing large sets of privacy-sensitive data in order to discover descriptive, predictive or even prescriptive insights about a group or groups of people, organisations or companies. This information may be of substantial commercial value. For example, a recommender system may include one or more network servers that run an algorithm to generate personal suggestions for individual users on the basis of data of a large group of users. The data is collected by client applications running on (mobile) devices of the users and transmitted to the server using a suitable client-server protocol.

Data processing schemes used in big data analytics are based on multiple sets of privacy-sensitive user inputs, wherein each set of user-inputs may be provided by a selected group of users, wherein the data processing may include computations, e.g. one or more arithmetical operations such as addition, multiplication, comparison, etc., of the collected data. Privacy-preserving protocols are used in order to eliminate or at least limit information leakage during the processing and transmission of the data. Typically, these techniques include obfuscating the privacy-sensitive data prior to the data processing and communication, which is typically performed in an untrustworthy environment.

WO2013066176 and WO2013066177 describe a privacy-preserving protocol for use in a recommender system wherein inputs from selected groups of users may be aggregated and processed in the encrypted domain using a cryptographic privacy-preserving protocol which may include the use of a homomorphic cryptographic system. The problem of such approach however is that despite the use of cryptographic techniques, information leakage is still possible. For example, Kononchuk et al. "*Privacy-preserving user data oriented services for groups with dynamic participation*", in Computer Security (ESORICS) Lecture Notes in Computer Science, 8134, Springer, Berlin, 2013) have shown that repeating such a protocol several times with groups of colluding users may cause information to leak away.

Kononchuk et al. suggested the so-called random user selection approach to cope with the problem of user collusion leading to information leakage. In this approach, a random subset of users is generated for the computation of an output function (e.g. computing suggestions in a recommendation system) based on a random bit vector, wherein each element of the vector indicates whether a particular user is selected or not for computing a current group service. This selection vector is kept hidden from all parties, including the server that is computing the aggregation. The use of the random user selection approach is further described in the article by Veugen et al., "*Improved privacy of dynamic group services*", EURASIP journal on information security, March 2017.

In Kononchuk et al. the random bits generation is solved by having each user randomly generating a permutation of length N in cleartext and encrypting the thus generated permutation. Then, the N encrypted permutations are concatenated in the encrypted domain forming one joint encrypted random permutation, and using this to permute an initial vector containing exactly t bits ('ones'). One problem associated with this solution is that when the number of permutations N becomes large (e.g. a random selection from a set of a million users or more) the permutation process as described by Kononchuk et al. becomes communicational and computational complex. Random bit generation by means of permutation matrices requires N matrix multiplications, wherein each matrix multiplication requires exchange of information between the participating client devices. In practical implementations however, client devices are heterogeneous devices, typically mobile devices having limited resources. Hence, the communication and computational complexity of the protocol should be minimized without compromising the security of the protocol.

Generally, there is a need in the art for improved methods and systems for privacy-preserving random group selection. In particular, there is a need in the art for methods and systems that enable secure random selection of a group of client devices and secure aggregation of privacy sensitive data of a randomly selected group of client devices. This efficiency is especially important for data analytics applications, as more efficient algorithms allow for e.g. recommender systems to be more responsive to changes in user behavior; and packaging of more information, such as user behavior history, leads to more accurate predictions.

SUMMARY OF THE INVENTION

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by, or in connection with, an instruction execution system, apparatus, or device.

Program code embodied on a computer readable medium may be transmitted using any appropriate medium, including, but not limited to, wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to exemplary flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In an aspect, the invention may relate to a method for secure computation of inputs of t client devices which are randomly selected from a set of N client devices.

In an embodiment, the method may comprise: client devices i (i=1, . . . , N) of the set of N client devices generating, preferably jointly, a random binary vector b of weight t in an obfuscated domain, the generating including using random numbers to randomly swap bit values $b_i$ at different positions i (i=1, . . . , N) in the binary vector; each client device i (i=1, . . . , N) transforming an input value $x_i$ into the obfuscated domain and determining the product $b_i \cdot x_i$ of bit value $b_i$ at position i of the random binary vector and the input value $x_i$ in the obfuscated domain; and, performing a secure computation in the obfuscated domain on the basis of the products $b_i \cdot x_i$ (i=1, . . . , N).

In an embodiment, bit value $b_i$ at position i in the random binary vector b may signal if client device i is selected or not. For example, a bit value one at position i in the binary vector may indicate that client device i has been selected.

Hence, the method steps are executed in the obfuscated domain, which means that the operations are executed based on obfuscated values. For example, obfuscated random numbers (e.g. encrypted or secret-shared random numbers) are used to randomly swap obfuscated bit values $b_i$ (e.g. encrypted or secret-shared bit values) at different positions i (i=1, . . . , N) in the obfuscated random binary vector. Similarly, obfuscated input values $x_i$ and obfuscated bit values $b_i$ are used to determine the obfuscated product $b_i \cdot x_i$, which is used to perform secure computations.

In an embodiment, the obfuscated domain may be an encrypted domain based on e.g. homomorphic encryption. In another embodiment, the obfuscated domain may be a secret-sharing domain based on a secret sharing scheme.

Hence, the method provides a computationally and communicationally efficient scheme for secure selection of a random group of client devices from a set of N client devices. The method relies on randomly swapping bits in a binary vector in the obfuscated domain. Additionally, the method provides a computationally and communicationally efficient scheme for performing secure computations based on the input values of the randomly selected client devices. Both the random selection and the computations are executed in the obfuscated domain so that neither the client devices, nor devices external to the client devices, e.g. a server, have knowledge about the group that is selected for the computation, or about the computation itself (e.g. the input values and/or the outcome of the computation).

The secure random bit generation protocol takes not more than 3 tN secure multiplications. This is a more efficient way (i.e. compared to Kononchuk et al) of securing the privacy of users as secured against collusion by malicious users.

Embodiments of the invention are particular useful for big data analytics applications that involve multi-party computations in which the privacy of users needs to be secured. These applications include (but not limited to) online or cloud-based processing of private-sensitive data for recommender systems, processing metrics in television and multimedia applications (e.g. audience ratings of channel usage in television broadcast or streaming applications), processing of financial data of commercial and/or institutional organisations, etc.

In an embodiment, generating a random binary vector may include: determining an initial binary vector b of weight t by setting the first t bits to one: $b_i=1$, $1 \leq i \leq t$, and all further bits to zero: $b_i=0$, $t<i \leq N$; generating a random binary vector on the basis of the initial binary vector, the generating including each of the client devices determining, preferably jointly, a position n in the binary vector and a random number r in the range {n, n+1, . . . , N}; and, using the random number r to swap binary values at position n and position r of the binary vector b. In an embodiment, for each position n ($1 \leq n \leq t$) in the binary vector: generating a random number r and swapping the binary value at position n and position r in the binary vector b.

In an embodiment, the swapping of the bits may be based on a delta function ($\delta_i^n$, wherein ($\delta_i^n=1$, if a random value $r_n=i$, and $\delta_i^n=0$, for all other i positions in the vector.

In an embodiment, the delta function $\delta_i^n$ may be defined on the basis of a polynomial function $D_i^n(x)$:

$$D_i^n(x) = \prod_{j=n, j \neq i}^{N} \frac{x-j}{i-j} = \sum_{j=0}^{N-n} d_j x^j$$

wherein $d_j$ represent coefficients of the Lagrange polynomial $D_i^n(x)$. Thus, a Lagrange interpolation function representing the delta function $\delta_i^n$ may be used to manipulate, e.g. swap, pairs of values in the binary vector in the obfuscated domain.

In an embodiment, the obfuscated domain may be based on a homomorphic cryptosystem, preferably an additively homomorphic cryptosystem.

In an embodiment, the random generated binary vector may include encrypted random bits $[b_i]$, $1 \leq i \leq N$, such that $\Sigma_i b_i = t$; wherein the client device i processes its input $x_i$ on the basis of the binary vector of encrypted bits by computing $[x_i \cdot b_i] = [b_i]^{x_i}$; and, wherein the secure computation in the obfuscated domain is based on the computed values $[x_i \cdot b_i]$ (i=1, . . . , N).

In an embodiment, the method may further include: each of the client devices i transmitting the computed value $[x_i \cdot b_i]$ to a server, preferably an aggregation server; and, the server performing the secure computation on the basis of the computed values $[x_i \cdot b_i]$ (i=1, . . . , N).

In an embodiment, the method may further include: each of the client devices transmitting the computed value $[x_i \cdot b_i]$ to one or more client devices; and, the one or more client devices performing the secure computation on the basis of $[x_i \cdot b_i]$ (i=1, . . . , N).

In an embodiment, the obfuscated domain may be based on a secret-sharing system, preferably the secret-sharing system being based on a modulo computation using a fixed prime p.

In an embodiment, the random generated binary vector may include secret-shared random bits $\langle b_i \rangle$ $1 \leq i \leq N$, such that $\Sigma_i b_i = t$; wherein the client device i determines a secret share $\langle x_i \rangle$ using the fixed prime p, and the clients jointly compute $\langle b_i \cdot x_i \rangle$; and wherein the secure computation in the obfuscated domain is based on the computed values $\langle b_i x_i \rangle$ (i=1, . . . , N).

In a further aspect, the invention may relate to a system for secure computation of inputs of t client devices which are randomly selected from a set of N client devices. In an embodiment, the system may comprise: a set of client devices i (i=1, . . . , N), each client device comprising a computer readable storage medium having computer readable program code embodied therewith, the program code including an obfuscation function, preferably a homomorphic encryption function, or a secret-sharing function, for performing computations in an obfuscated domain and a processor, preferably a microprocessor, coupled to the computer readable storage medium, wherein responsive to executing the first computer readable program code, wherein the processor is configured to perform executable operations comprising: generating a random binary vector b of weight t in an obfuscated domain, preferably an encrypted domain or a secret-sharing domain, the generating including using random numbers to randomly swap bit values $b_i$ at different positions i (i=1, . . . , N) in the binary vector; transforming an input value $x_i$ into the obfuscated domain, and determining the product $b_i \cdot x_i$ of bit value $b_i$ at position i of the random binary vector and the input value $x_i$ in the obfuscated domain; and, transmitting the computed product $b_i \cdot x_i$ to a server system or to a further client device, wherein the server or the further client device is configured to perform a secure computation in the obfuscated domain on the basis of the products $b_i \cdot x_i$ (i=1, . . . , N) computed by each client device i (i=1, . . . , N).

In a further aspect, embodiments may relate to client apparatuses. Such client apparatus may be used in a system for secure computation. Such system may perform secure computations based on inputs of t client apparatuses, which are randomly selected from a set of N client apparatuses. In an embodiment, the client apparatus may comprise: a computer readable storage medium having computer readable program code embodied therewith, the program code including an obfuscation function, preferably a homomorphic encryption function or a secret-sharing function, for performing computations in an obfuscated domain and a processor, preferably a microprocessor, coupled to the computer readable storage medium, wherein responsive to executing the first computer readable program code, wherein the processor is configured to perform executable operations.

In an embodiment, the executable operation may comprise: generating a random binary vector b of weight t in the obfuscated domain, the generating including using random numbers to randomly swap bit values $b_i$ at different positions i (i=1, ..., N) in the binary vector; and, transforming an input value $x_i$ into the obfuscated domain and determining the product $b_i \cdot x_i$ of bit value $b_i$ at position i of the random binary vector and the input value $x_i$ in the obfuscated domain.

In an embodiment, the executable operations may further comprise: transmitting the computed product $b_i \cdot x_i$ to a server system or to a further client device, wherein the server or the further client device is configured to perform a secure computation in the obfuscated domain on the basis of the products $b_i \cdot x_i$ (i=1, ..., N) computed by each client device i (i=1, ..., N).

In a further aspect, embodiments may relate to methods for secure random selection of t client devices from a set of N client devices. In an embodiment, the method may comprise: determining an initial binary vector b of weight t by setting the first t bits to one: $b_i=1$, $1 \leq i \leq t$, and all further bits to zero: $b_i=0$, $t<i \leq N$; each client device i (i=1, ..., N) of the set of N client devices jointly generating a random binary vector b of weight t in an obfuscated domain on the basis of the initial binary vector b, a bit i in the random binary vector b signalling if client device i is selected or not, the generation of the random binary vector including: determining a position n in the binary vector; determining a random number r in {n, n+1, ... N}; and, using the random number to swap binary values at positions n and r of the binary vector b.

The secure random selection process may be used in any multi-party computation scheme that requires secure selection of t users (client devices) from a group of N users (client devices).

In an embodiment, the swapping of the binary values at positions n and r may be based on a delta function $\delta_i^n$, wherein $\delta_i^n=1$, if a random value $r_n=i$, and $\delta_i^n=0$, for all other i positions in the vector. In an embodiment, the delta function $\delta_i^n$ may be defined on the basis of a polynomial function $D_i^n(x)$:

$$D_i^n(x) = \prod_{j=n, j \neq i}^{N} \frac{x-j}{i-j} = \sum_{j=0}^{N-n} d_j x^j$$

wherein $d_j$ represent coefficients of the Lagrange polynomial $D_i^n(x)$.

In an embodiment, the obfuscated domain may be based on a homomorphic cryptosystem, preferably an additive homomorphic cryptosystem.

In an embodiment, determining a random number r may further include: each client device i generating l random bits, $0 \leq j < l$, where l is such that $2^{l-1} \leq N-n < 2^l$, encrypting the random bits $\alpha_i^j$ using the homomorphic cryptosystem; each client device computing l encrypted random bits $[\alpha^j]$, $0 \leq j < l$, wherein $[\alpha^j] = [\alpha_1^j \oplus \alpha_2^j \oplus \ldots \oplus \alpha_N^j]$); each client device i computing an encrypted random number [r] on the basis of the encrypted random bits $[\alpha^j]$.

In an embodiment, the computation of the encrypted random number may include $[r] = [\sum_{j=0}^{l-1} \alpha^j \cdot 2^j] = \prod_{j=0}^{l-1} [\alpha_j]^{2^j}$.

In an embodiment, the obfuscated domain may be based on a secret-sharing system, preferably the secret-sharing system being based on a modulo computation using a fixed prime p.

In an embodiment, the determining of a random number r may further include: each client device i may generating l random bits $\alpha_i^j$, $0 \leq j < l$, where l is such that $2^{l-1} \leq N-n < 2^l$, transforming the random bits to the secretly-shared domain; the client devices jointly compute l secretly-shared random bits $\langle x^j \rangle$, $0 \leq j < l$ wherein $\langle \alpha^j \rangle = \langle \alpha_1^j \oplus \alpha_2^j \oplus \ldots \oplus \alpha_N^j \rangle$; each client device i computing the secretly shared random number $\langle r \rangle$ the basis of the secretly-shared random bits $\langle \alpha^j \rangle$. In an embodiment, the computation of the secretly-shared random number may include $\langle r \rangle = \sum_{j=0}^{l-1} \langle \alpha_j \rangle \cdot 2^j$.

Embodiments may also relate to a program product comprising software code portions configured for, when run in the memory of a computer, executing any of the method steps described above.

BRIEF DESCRIPTION OF THE DRAWINGS

Aspects of the invention will be further illustrated with reference to the attached drawings, which schematically will show embodiments. It will be understood that the invention is not in any way restricted to these specific embodiments.

DETAILED DESCRIPTION

Figure 1:
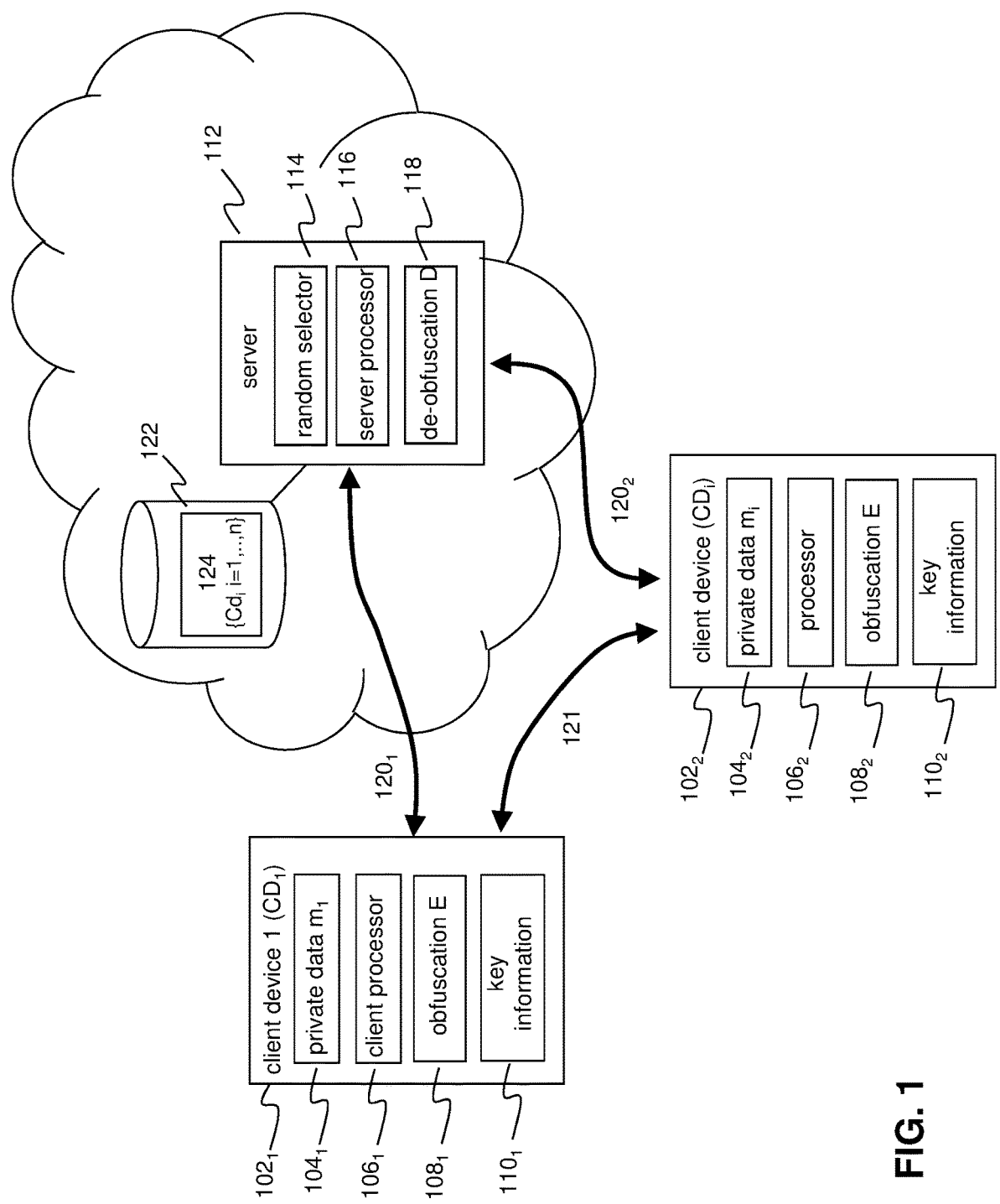
FIG. 1 schematically depicts a system for secure computation of inputs of a randomly selected group of client devices according to an embodiment of the invention.

The embodiments in this disclosure generally relate privacy-preserving random group selection schemes and multi-party computation schemes, such as used in data-analytics, using such privacy-preserving random group selection, in particular privacy-preserving multi-party computation schemes wherein a random securely selected group of client devices may jointly compute a function on the basis of privacy sensitive user data. FIG. 1 schematically depicts a system for secure computation of inputs of a randomly selected group of client devices according to an embodiment of the invention. The system may comprise client devices $102_{1,2}$ and, in some embodiments, at least one server 112, e.g., an aggregation server. Each client device may comprise a processor $106_{1,2}$ adapted to run one or more applications, e.g. software applications including software code when executed by the processor configuring the client device to collect or generate privacy sensitive user data, e.g. medical data, financial data, user behaviour data, commercially sensitive data, etc. Hereafter, privacy sensitive user data associated with client device i may be referred to in short as private data $m_i$.

A client device may be implemented on a user apparatus, e.g. a smart phone, a computer, a server, a (smart) television, a vehicle or any consumer or industrial electronic apparatus that is configured to process and/or generate private data. Client devices may typically comprise a wireless or a hardwired communication interface allowing client devices to communicate with each other or with network elements, e.g. servers, in the network. The client devices and the server may use a secure protocol, in particular a secure multi-party computation protocol based on an obfuscation scheme, e.g. an encryption scheme or secret sharing scheme, which ensures secure communication between the client devices and the aggregation server 112. The server may comprise a processor 116 adapted to process the private data in the obfuscated domain. Communication between the client devices and the server device in the network may be based on a suitable client server protocol $120_{1,2}$ e.g. an HTTP protocol or the like. Further, during the execution of the secure multi-party computation protocols described in this application, client devices may exchange information with each other using a central model, e.g. a trusted server or using a decentralized communication model on the basis of a suitable peer-to-peer protocol 121, e.g. the well-known BitTorrent protocol or a derivative thereof.

In an embodiment, when the system of FIG. 1 is configured to process data in the encrypted domain, the secure protocol may be based on a homomorphic cryptosystem. The homomorphic cryptosystem may comprise an encryption function E and a decryption function D, wherein a homomorphically encrypted value E(x) may be notated in short as [x], wherein the homomorphic properties of the cryptosystem allow certain computations in the encrypted domain. For example, in an embodiment, the homomorphic cryptosystem may be an additively homomorphic crypto system having the property $[x_1] \cdot [x_2] = [x_1 + x_2]$. The well-known ElGamal cryptosystem may be designed to have additively homomorphic properties. The processing of the data by the aggregation server in the encrypted domain may include one or more computations, e.g. additions and/or multiplications. In an embodiment, the computations may be part of a data processing algorithm that is used by a data analytics application.

In an embodiment, the homomorphic cryptosystem may be configured as a so-called homomorphic threshold cryptosystem. Examples of homomorphic threshold cryptosystems are described in the article by Y. Desmedt and Y. Frankel, with title "*threshold cryptosystems*", CRYPTO 1989, P. 308-315, Springer-Verlag. The threshold homomorphic cryptosystem is associated with key information $110_{1,2}$, including public key information, e.g. a public encryption key e that is shared by the client devices and the aggregator server, and secret key information including a secret decryption key d, which may be secret-shared among the client devices. Each client device i may be provided with a decryption share $d_i$ of the secret decryption key d, wherein the decryption operation needs to be jointly performed by sufficiently many clients.

An example of a privacy-preserving computing system that is based on a threshold homomorphic cryptosystem is described in a related. European patent application EP 17177653.7 with title "Privacy preserving computation protocol for data analytics", which is herewith incorporated by reference into the description of this application.

In another embodiment, when the system of FIG. 1 is configured to process data in the secret-shared domain, the secure protocol may be based on a secret-sharing system. An example of such secret-sharing system is described in the article by Damgard et al., "*Unconditionally secure constant-rounds multi-party computation for equality, comparison, bits and exponentiation*", In: Halevi, S., Rabin, T. (eds.) TCC 2006, LNCS, vol. 3876, pp. 285-304. Springer, Heidelberg. In such secret-sharing scheme, values are usually computed on the basis of a modulo operation using a fixed prime p. Having a secret sharing $\langle x \rangle$ means that each client device i has a (meaningless) share $x_i$, such that $\Sigma_i x_i$, mod p=x. Adding two secret-shared values is simply locally adding the shares. Multiplying two secret-shared values $\langle x \rangle$ and $\langle y \rangle$ however, requires a protocol and communication between the parties. As a prerequisite, the parties should hold secret-sharings of three random numbers a, b, and c, such that c=(a·b) mod p.

In the system of FIG. 1, the client devices may form a group of N client devices, wherein each client device $CD_i$ of index i (i=1, . . . , n) may comprise an obfuscation function $108_{1,2}$, e.g. encryption function E of an homomorphic cryptosystem, in order to obfuscate private data $m_i$ $104_{1,2}$ before sending the data to the aggregation server. Further, the aggregator server may comprise a de-obfuscation function 118, e.g. a decryption function D of the homomorphic cryptosystem, so that—after processing the obfuscated private data in the obfuscated domain—it can access the cleartext result of the processing by transforming the obfuscated result back to the cleartext domain. A storage medium 122, e.g. a database, connected to the aggregation server may comprise client information 124 regarding client devices that may participate in the aggregation process. Such client information may include location information, e.g. an URL or a network address, and client identifiers $\{CD_i\}$ for uniquely identifying each client device. Alternatively, and/or additionally, a client device (identified by a client identifier) may be associated with an index i, preferably a countable index i, (i.e. a quantity which can take on a set of integer values and is used to designate one out of a number of possible values associated with this value). This index may hereafter be referred to as a client index. The client information may be used by the server to establish data connections with the different client devices.

The secure protocol is configured as a privacy-preserving protocol allowing a server processor 116 to securely process, e.g. aggregate, private data $m_i$ of a group of (at least) t client devices randomly selected from N client devices without the risk that the server and/or client devices learn the individual private data $m_i$ and without leaking information of user inputs to sources. Selection of the client devices by the aggregation server may be realized by a selector 114.

In many big data applications, the aggregation process is repeated multiple times wherein each time the selector 114 may select a different group of client devices from the N client devices. However, as shown by Kononchuk et al., when the computing system repeats the aggregation process a number of times for different groups of users, information about the private data may leak away. For example, when the aggregator server would collude with t−1 users, it is possible to obtain the private input of any other user in this way.

Figure 2:
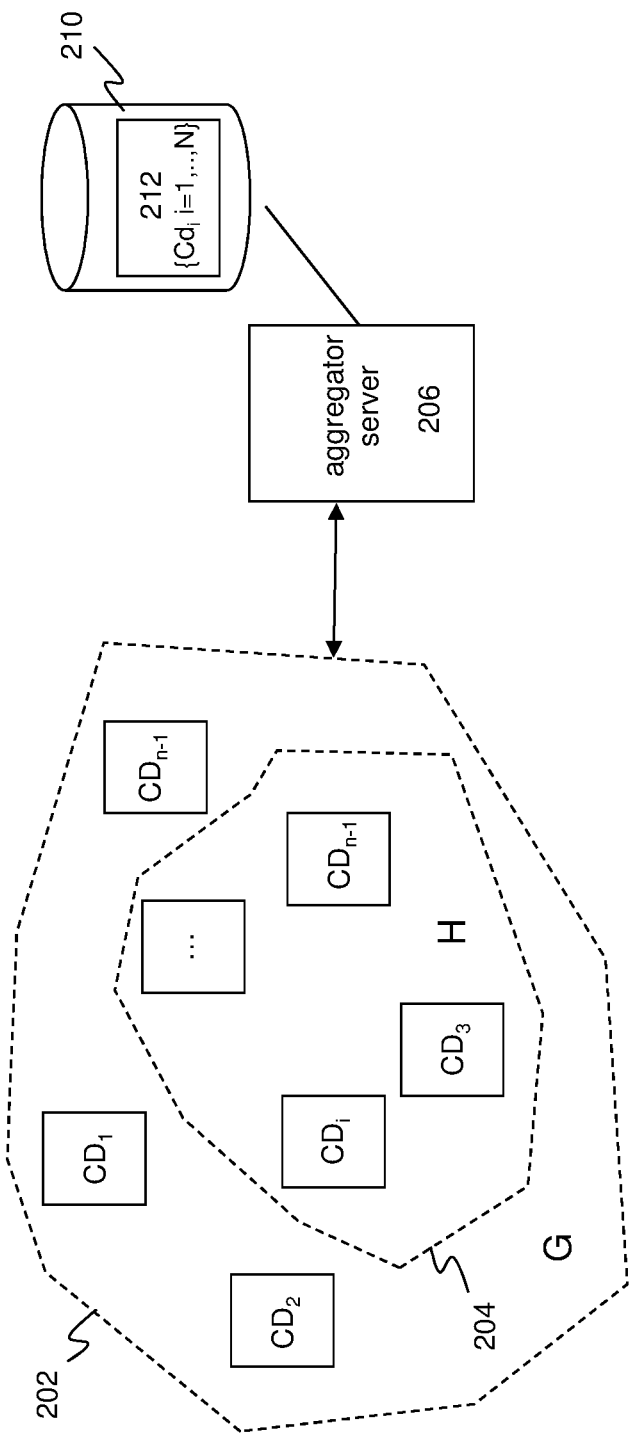
FIG. 2 schematically depicts randomly selected group of client devices in an obfuscated domain according to an embodiment of the invention.

This information leakage problem may be addressed by implementing the selector 114 as a secure random group selection processor. This selector may trigger the N client devices to execute a random group selection protocol. As shown in FIG. 2, this protocol is adapted to randomly select a subgroup H 204 of t client devices from a group G 202 of N client devices, such that neither the user of the aggregator server 206, nor the users of the client devices can influence the result. In an embodiment, such random selection may be realized by the client devices jointly generating a set of (homomorphically) encrypted bits $[b_i]$, $1 \leq i \leq N$, such that $\Sigma_i b_i = t$. To avoid the 'dummy user' attack, the protocol for generating the bits should be secure, even when only one user is honest.

Prior art solutions include a random group selection process that involves the execution of permutations in the encrypted domain resulting in a computation-heavy protocol, which renders the protocol not, or at least less, suitable for practical applications. It is an aim of the embodiments in this application to provide an efficient privacy-preserving random group selection process which eliminates, or at least reduces, the risk of leakage of privacy sensitive information in multi-party computation schemes, which are often used in data analytics applications. In an embodiment, such random group selection process may be used in a privacy-preserving computing system as described with reference to FIG. 1. Such system may be part of a multi-party computation system, e.g. a recommender system as e.g. described with reference to WO2013066176 and WO2013066177.

The random group selection processes used in the embodiment of this application may be based on a set of bits, e.g. a binary vector $b_i$, $1 \leq i \leq N$, which is used to identify which client device in a set of N client devices is selected. For example, setting the k-th bit of the vector to one (i.e. $b_k=1$) may indicate that client device with client index $i=k$ has been selected to participate in a multi-party computation scheme, e.g. secure data aggregation process. Hence, randomly selecting a group of client devices includes securely and randomly setting t bits in the vector to one. The random group selection process according to the invention thus includes the generation of a binary vector of weight t, using a random bit generation method in a domain in which the bits are obfuscated, e.g. the encrypted domain or the secret-sharing domain. Here, the (Hamming) weight t of a binary vector may be defined as the sum of the bit values of the binary vector.

The random binary vector generation may include a swapping process, wherein random numbers are used to swap two bits in the binary vector. This process may include an initial step in which a binary vector of weight t is initialized by setting the first t bits to one: $b_i=1$, $1 \leq i \leq t$, and all further bits to zero: $b_i=0$, $t<i \leq N$. Thereafter, a bit swapping process may be repeated t times. An example of such bit swapping protocol may look as follows.

For n=1 to t do:
1. Client devices jointly generate a random number r in (n, n+1, . . . N);
2. Each client device swaps the binary values at positions n and r of vector b.

After execution of this bit swapping protocol, each bit $b_i$ is one with probability t/N. It only requires the generation of t random numbers and performing t swaps instead of generating N random permutations in cleartext and N times permuting all items in the encrypted domain as known from the prior art. The randomly generated vector represents a randomly selected group of client devices, wherein a bit at the k-th position in the vector signal indicates whether client device with index k is part of the selected group. In order to avoid leakage of the selection process to unauthorized users, the swapping protocol is executed in an obfuscated domain. Transforming the swapping protocol to such obfuscated domain, e.g. the encrypted domain or the secret-sharing domain, is however not a trivial exercise. This will be illustrated in more detail in the embodiments hereunder.

In an embodiment, the bit swapping protocol may be executed in the encrypted domain using e.g. a homomorphic encryption system. In that case, a binary vector b of encrypted bits may be generated in which the first t encrypted bits may be set to one: $[b_i]=[1]$, $1 \leq i \leq t$ and the rest of the encrypted bits may be set to zero: $[b_i]=[0]$, $t<i \leq N$. Further, t encrypted random numbers $[r_n]$, $1 \leq n \leq t$, need to be generated by the system such that $r_n$ is uniformly drawn from the set (n, n+1, . . . N).

Thereafter, a bit swapping process may be executed in which the encrypted random numbers $[r_n]$ are used to swap encrypted bits in the binary vector.

In order to process bits of the binary vector, a suitable bit manipulation function may be used. In an embodiment, a delta function $\delta_i^n$ may be used for processing bits in the binary vector, wherein $\delta_i^n=1$, if $r_n=i$, and 0, for all other i positions in the vector. Hence, the delta function sets the bit at position $r_n$ in the binary vector to one, and to 0 for all other positions.

In order to transform the delta function to an obfuscated domain, the function may be defined on the basis of a Lagrange interpolation scheme wherein a function $D_i^n(x)$ may define the following polynomial:

$$D_i^n(x) = \prod_{j=n, j \neq i}^{N} \frac{x-j}{i-j} = \sum_{j=0}^{N-n} d_j x^j$$

Here, the coefficients $d_j$ represent coefficients of the Lagrange polynomial $D_i^n(x)$. Based on this function, $\delta_i^n$ can be constructed as follows: $\delta_i^n = D_i^n(r_n)$, $n \leq i \leq N$, which represents a bit on position $r_n$ in the binary vector. This function can be transformed into the encrypted domain using an additively homomorphic cryptosystem and the Lagrange coefficients $d_j$:

$$[\delta_i^n] = \Pi_{j=0}^{N-n} [r^j]^{d_j}$$

As shown by this expression, the homomorphic encryption transforms the summation into a product. This encrypted delta function may be used to process, e.g. swap, bits in the encrypted domain. This way, a bit swapping process may be executed in the encrypted domain, which includes swapping t encrypted bits of the binary vector based on encrypted random numbers.

A process of securely generating random bits, e.g. in the form of a random binary vector, according to an embodiment of the invention may look as follows:

For n=1 to t do
1. a set of N client devices jointly generate an encrypted random number [r], such that $r \in \{n, n+1, \ldots, N\}$;
2. the client devices jointly compute $[r^j]$, for each j, $1 \leq j \leq N-n$, using secure multiplications;
   a. for i=n to N do:
      i. each user computes the coefficients $d_j$, $0 \leq j \leq N-n$, of the polynomial $D_i^n(x)$;
      ii. each client device computes $[\delta_i^n] = \Pi_{j=0}^{N-n}[r^j]^{d_j}$
   b. each client device computes $[b] = \Pi_{i=n}^{N}[b_i \cdot \delta_i^n]$, after N−n+1 joint secure multiplications, such that $b=b_r$;
   c. set $[b_n]=[b]$ ($b_n \leftarrow b_r$);
   d. for i=n to N do
      each client device computes
      $[b_i]=[\delta_i^n] \cdot [b_i] \cdot [\delta_i^n \cdot b_i]^{-1}$ after a joint secure multiplication of $[\delta_i^n]$ and $[b_i]$ ($b_r \leftarrow b_n$).

In step 2.d of the protocol above, the new value of $b_i$ becomes $\delta_i''+b_i-\delta_i''\cdot b_i$, which equals 1, if $\delta_i''=1$, and $b_i$, it $\delta_i''=0$. Since $b_n=1$, and $\delta_i''=1$ exactly when i=r, we get $b_r \leftarrow b_n$, where the other $b_i$ remain unaltered. This secure random bit generation protocol takes not more than 3 tN secure multiplications and t random number generations. In contrast, the generation by means of permutation matrices as described by Kononchuk et al. requires N matrix multiplications, which sums up to $N^4$ secure multiplications.

In the above-described random bit generation protocol, the N client devices need to jointly generate an encrypted random number r, $r \in (n, n+1, \ldots, N)$.

In an embodiment, such encrypted random number may be generated by the client devices as follows:

1. each client device i may generate l random bits $\alpha_i^j$, $0 \leq j < l$, where l is such that $2^{l-1} \leq N \leq n < 2^l$, and encrypts the random bits using an homomorphic cryptosystem;
2. the client devices jointly compute l random bits $[\alpha^j]$, $0 \leq j < l$, which can be computed using N secure multiplications, since the exclusive-or $\alpha_1 \oplus \alpha_2 = \alpha_1 + \alpha_2 - 2\alpha_1 \cdot \alpha_2$ (here $\alpha^j$ are truly random as long as the user of one client device is honest: $[\alpha^j]=[\alpha_1^j \oplus \alpha_2^j \oplus \ldots \oplus \alpha_N^j]$);
3. the client devices jointly compute $[r]=[\Sigma_{j=0}^{l-1}\alpha^j \cdot 2^j]= \Pi_{j=0}^{l-1}[\alpha_j]^{2^j}$;
4. the client devices check whether $r \leq N-n$, by securely computing the encrypted comparison bit $[\gamma]$ where $\gamma=1$, if $r \leq N-n$, and 0, otherwise (this step may be executed within l secure multiplications, since the encrypted bits $[\alpha^j]$ of r are given);
5. the client devices decrypt $\gamma$ and if $\gamma=1$, $[r] \leftarrow [r+n]=[r] \cdot [n]$.

If $\gamma=1$, this protocol securely generates an encrypted random number r from the set $\{n, n+1, \ldots, N\}$. The computation of the comparison is known per se. An example of such computation is described in B. Schoenmakers and P. Tuyls, *Practical Two-Party Computation based on the Conditional Gate*, ASIACRYPT 2004, Lecture Notes in Computer Science 3329 (2004) 119136. Springer-Verlag. Typically, to generate many bounded random numbers, per random number four executions of the protocol above is sufficient.

In the above-described protocol, the client devices use a secure multiplication protocol, which is described hereunder in greater detail, in this scheme, initially, the client devices hold encryptions of additively homomorphically encrypted numbers [x] and [y], and would like to securely compute an encryption [x·y] of the product. To that end, the client devices may execute the following steps:

1. each client device i may generate two large random numbers $r_i^x$ and $r_i^y$, encrypt both numbers $[r_i^x]$ and $[r_i^y]$, and broadcast the two encryptions to all other client devices;
2. each client device may compute two encrypted random numbers $[r^x]=[\Sigma_i r_i^x]=\Pi_i[r_i^x]$ and $[r^y]=[\Sigma_i r_i^y]=\Pi_i[r_i^y]$;
3. the client devices may then compute $[x+r^x]=[x] \cdot [r^x]$ and $[y+r^y]=[y] \cdot [r^y]$, and decrypt both values into $x+r^x$ and $y+r^y$;
4. client device i may further compute $[z_i]=([r^y] \cdot [y])^{r_i^x} \cdot [x]^{r_i^y}$, and broadcast it to all other client devices;
5. the client devices then compute $[z]=[(x+r^x)] \cdot [(y+r^y)] \cdot (\Pi_i[z_i])^{-1}$.

In the scheme above, the integers $x+r^x$ and $y+r^y$ may be safely decrypted, since the values of x and y are additively blinded by a large random number, which is unknown to each party. It can be shown that $z=x \cdot y$: $(x+r^x) \cdot (y+r^y)=xy+xr^y+r^x y+r^x r^y=xy+\Sigma_i z_i$.

Figure 3:
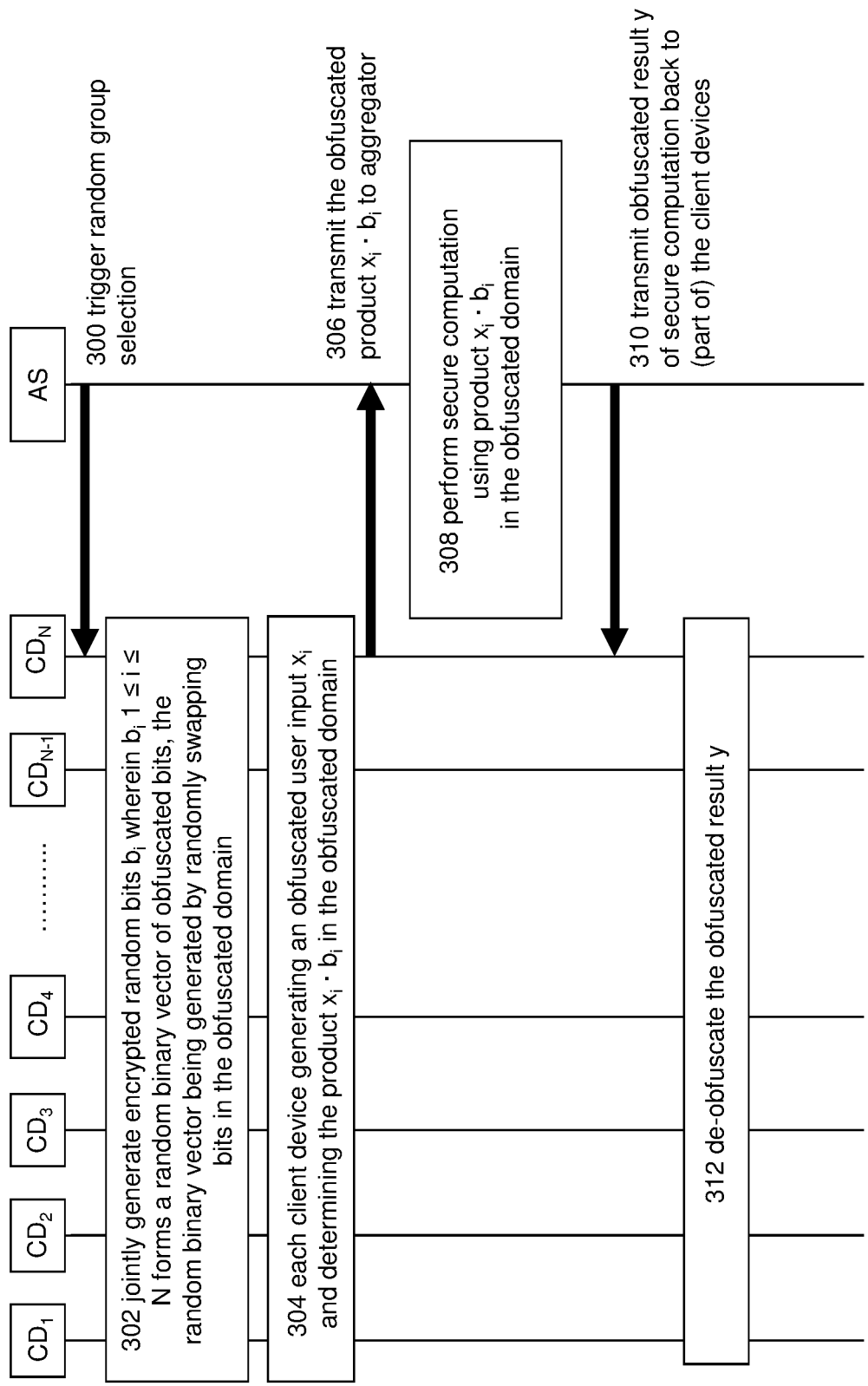
FIG. 3 depicts a method for secure computation of inputs of a randomly selected group of client devices according to an embodiment of the invention.

In an embodiment, the above-described privacy-preserving random group selection process may be used for secure aggregation of private data. FIG. 3 depicts a method for secure computation of inputs of a randomly selected group of client devices according to an embodiment of the invention. In a first step 300, a server may initiate a random group selection process in order to securely aggregate data from the selected group of client devices. In step 302, the client devices may jointly generate encrypted random bits $b_i$ wherein $b_i$, $1 \leq i \leq N$, forms a random binary vector of obfuscated bits, the random binary vector being generated by randomly swapping bits in the obfuscated domain. Thereafter, each client device may generate an obfuscated user input $x_i$ and determine the product $x_i \cdot b_i$ in the obfuscated domain (step 304). Each client device then transmits the obfuscated product $x_i \cdot b_i$ to an aggregation server (step 306), which may use the products to perform secure computation in the obfuscated domain (step 308). The obfuscated result y of secure computation may be transmitted back to (part of) the client devices, which may de-obfuscate the obfuscated result y (step 308).

The method allows secure computation of user inputs of t client devices, which are randomly selected from a group of N client device. The process includes a secure selection of client devices in the obfuscated domain, so that neither the client devices, nor the server, know which inputs are used in the computation. Here, the number t may be selected based on various considerations including e.g. the computation and communication time that is needed in order to process data of the selected client devices, the trust in the network, etc. The selection includes an efficient bit swapping process. The process may be implemented using different obfuscation schemes.

Figure 4:
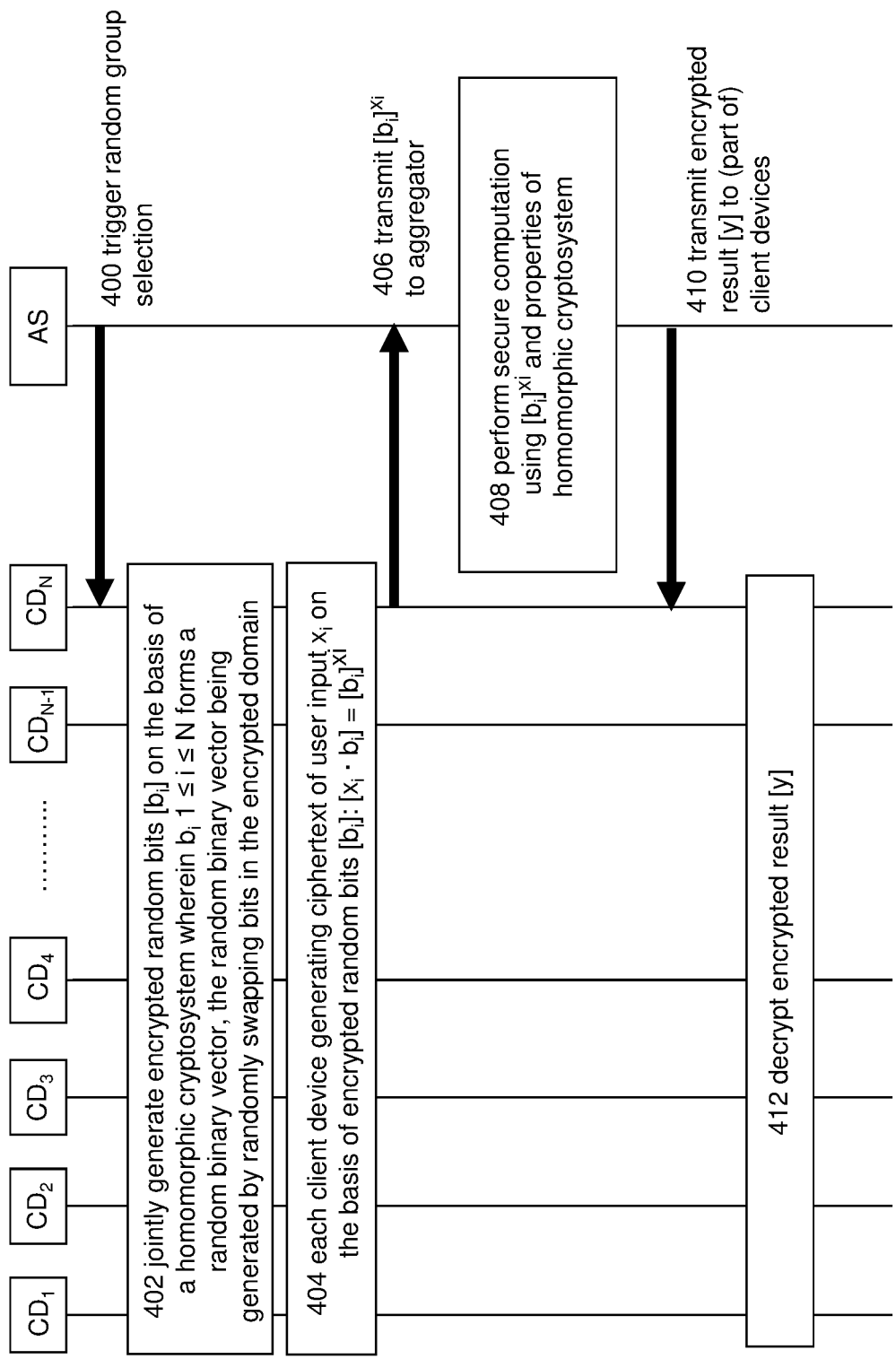
FIG. 4 depicts a method for secure computation of inputs of a randomly selected group of client devices according to another embodiment of the invention.

FIG. 4 depicts a method for secure computation of inputs of a randomly selected group of client devices according to another embodiment of the invention. In this embodiment, a homomorphic cryptosystem is used to obfuscate the privacy-sensitive user data and the processing of these user data. As shown in the figure, in a first step 400, a server may initiate a random group selection process to securely aggregate data from a selected group of client devices. Thereafter, the following steps may be executed:

1. N client devices may jointly generate encrypted random bits $[b_i]$, $1 \leq i \leq N$, such that $\Sigma_i b_i = t$ (step 402);
2. client device i may process its input $x_i$ on the basis of the binary vector of encrypted bits by computing $[x_i \cdot b_i]=[b_i]^{x_i}$ (step 404), and transmit the computed value $[x_i b_i]$ to a server, e.g. an aggregation server (step 406);
3. the server may process the inputs: $[y]=[\Sigma_i x_i \cdot b_i]=\Pi_i[x_i \cdot_i]$ (step 408), and transmit the result to one or more client devices (step 410).

In case threshold decryption is used, the aggregator may request t users to decrypt. [y]. In an embodiment, this may be combined with verifiable aggregation to assure that the aggregator added all inputs. Such scheme is described in a related European patent application EP 17177653.7 with title "*Privacy preserving computation protocol for data analytics*". This way, the aggregator obtains $y=\Sigma_{i \in H} x_i$, where the set $H=\{i | b_i=1\}$ is randomly chosen, and hidden from all parties.

In a further embodiment, a secret-sharing based secure multi-party computation system may be used to generate the random bits. The random bits $b_i$ may be computed and are secret-shared between N client devices. If desired, it is possible to transform such a shared secret to a homomorphically encrypted bit $[b_i]$. This way, an aggregation server may add up encrypted inputs (as described hereunder in more detail).

When using secret-sharing, as e.g. described in the article by Damgard et al., "*Unconditionally secure constant-rounds multi-party computation for equality, comparison, bits and exponentiation*", each secret value x is secret-shared which is indicated by the notation $\langle x \rangle$.

Similar to the above-described embodiment related to homomorphic encryption, the main problem is how to securely generate N secret-shared bits $\langle b_i \rangle$, such that $\Sigma_i b_i = t$. Also in this case, prior art solution such as Kononchuk et al. suggest to generate N random permutations of length N by client devices, encrypting these permutations and concatenating these encrypted permutations into one random permutation in the encrypted domain, which will lead to very inefficient and computational heavy processes. Translating the random bit generation process of the invention into the secret-sharing domain will provide a very efficient and secure random group selection process.

The protocol for securely multiplying two secret-shared numbers however differs from a secure multiplication based on (threshold) homomorphic encryption. In particular, in a secret-sharing scheme, values are computed on the basis of a modulo of a fixed prime p. Hence, having a secret share $\langle x \rangle$ means that each party i has a (meaningless) share $x_i$, such that $\Sigma_i x_i \bmod p = x$. Adding two secret-shared values is simply a client device locally adding the shares. Multiplying two secret-shared values $\langle x \rangle$ and $\langle y \rangle$ however, requires a protocol and communication between client devices. As a prerequisite, the client devices should hold secret-sharings of three random numbers a, b, and c, such that $c = (a \cdot b) \bmod p$. Then, a multiplication may look as follows:
1. the client devices locally compute $\langle d \rangle = \langle x \rangle + \langle a \rangle$, and $\langle e \rangle = \langle y \rangle \langle b \rangle$;
2. the client devices reveal the secrets d and e by broadcasting their shares of these two numbers;
3. the client devices compute $\langle z \rangle = de - d \cdot \langle b \rangle - e \cdot \langle a \rangle + \langle c \rangle$.

wherein $z = x \cdot y$, since $x \cdot y = (d-a)(e-b) = de - db - ae + ab$.

Given the secure multiplication protocol for secret-sharings, the secure random bit generation protocol in the encrypted domain can be easily translated into the secret-share domain by using $\langle . \rangle$ instead of $[.]$.

The secure random bit generation protocol in the secret-share domain may include an initialization process wherein a binary vector of secret-shared bits may be generated, in which the first t secret-shared bits may be set to one: $\langle b_i \rangle = \langle 1 \rangle$, $1 \leq i \leq t$ and the rest of the secretly shared bits may be set to zero: $\langle b_i \rangle = \langle 0 \rangle$, $t < i \leq N$.

Thereafter, a bit swapping process may be executed in the secret-shared domain, which includes swapping t secret-shared bits, e.g. the t secret shared bits of bit value one, of the binary vector in a similar way as described above with reference to the swapping process in the encrypted domain. In an embodiment, the process may look as follows:

For n=1 to t do
1. a set of N client devices jointly generate a secret-shared random number $\langle r \rangle$, such that $r \in \{n, n+1, \ldots, N\}$;
2. the client devices jointly compute $\langle r^j \rangle$, for each j, $1 \leq j \leq N-n$, using secure multiplications;
   a. for i=n to N do:
      i. each client device computes the coefficients $d_j$, $0 \leq j \leq N-n$, of the polynomial $D_i^n(x)$;
      ii. each client device computes $\langle \delta_i^n \rangle = \Sigma_{j=0}^{N-n} \langle r^j \rangle$;
   b. each client device computes $\langle b \rangle = \Sigma_{i=n \ldots N} \langle \delta_i^n \cdot b_i \rangle$, after N−n+1 joint secure multiplications, such that $b = b_r$;
   c. set $\langle b_n \rangle = \langle b \rangle$;
   d. for i=n to N do
      each client device computes $\langle b_i \rangle = \langle \delta_i^n \rangle + \langle b_i \rangle - \langle \delta_i^n \cdot b_i \rangle$ after a joint secure multiplication of $\langle \delta_i^n \rangle$ and $\langle b_i \rangle$.

In the above-described random bit generation protocol, the client device need to jointly generate an encrypted random number r, $r \in \{n, n+1, \ldots, N\}$. In an embodiment, such encrypted random number may be generated by the client devices as follows:
1. each client device i may generate l random bits $\alpha_i^j$, $0 \leq j < l$, where l is such that $2^{l-1} \leq N-n < 2^l$, and transform the random bits to the secretly-shared domain;
2. the client devices jointly compute l random bits $\langle \alpha^j \rangle$, $0 \leq j < l$; $\langle \alpha^j \rangle = \langle \alpha_1^j \oplus \alpha_2^j \oplus \ldots \oplus \alpha_N^j \rangle$, which can be computed within N secure multiplications, since the exclusive-or $\alpha_1 \oplus \alpha_2 = \alpha_1 + \alpha_2 - 2\alpha_1 \cdot \alpha_2$ (here $\alpha^j$ are truly random as long as the user of one client device is honest);
3. the client devices jointly compute $\langle r \rangle = \Sigma_{j=0}^{l-1} \langle \alpha_j \rangle \cdot 2^j$;
4. the client devices check whether $r \leq N-n$, by securely computing the comparison bit $\langle \gamma \rangle$, where $\gamma = 1$, if $r \leq N-n$, and 0, otherwise. This can be done within l secure multiplications, since the secret-shared bits of $\langle \alpha^j \rangle$ of r are given;
5. the client devices de-obfuscates $\gamma$ and if $\gamma = 1$, $\langle r \rangle \leftarrow \langle r+ \rangle = \langle r \rangle + \langle n \rangle$.

If $\gamma = 1$, this protocol securely generates a secret-shared random number r from the set $\{n, n+1, \ldots, N\}$. Typically, to generate many bounded random numbers, per random number four executions of the protocol above should suffice. In general, an addition of two encrypted values [x] and [y] is computed by $[x+y]=[x] \cdot [y]$, whereas secret-shared values are just (locally) added: $\langle x+y \rangle = \langle x \rangle + \langle y \rangle$. Similarly, $[c \cdot x] = [x]^c$ becomes $\langle c \cdot x \rangle = \langle x \rangle \cdot c$, which is locally multiplying (modulo p) each share with the known number c.

Figure 5:
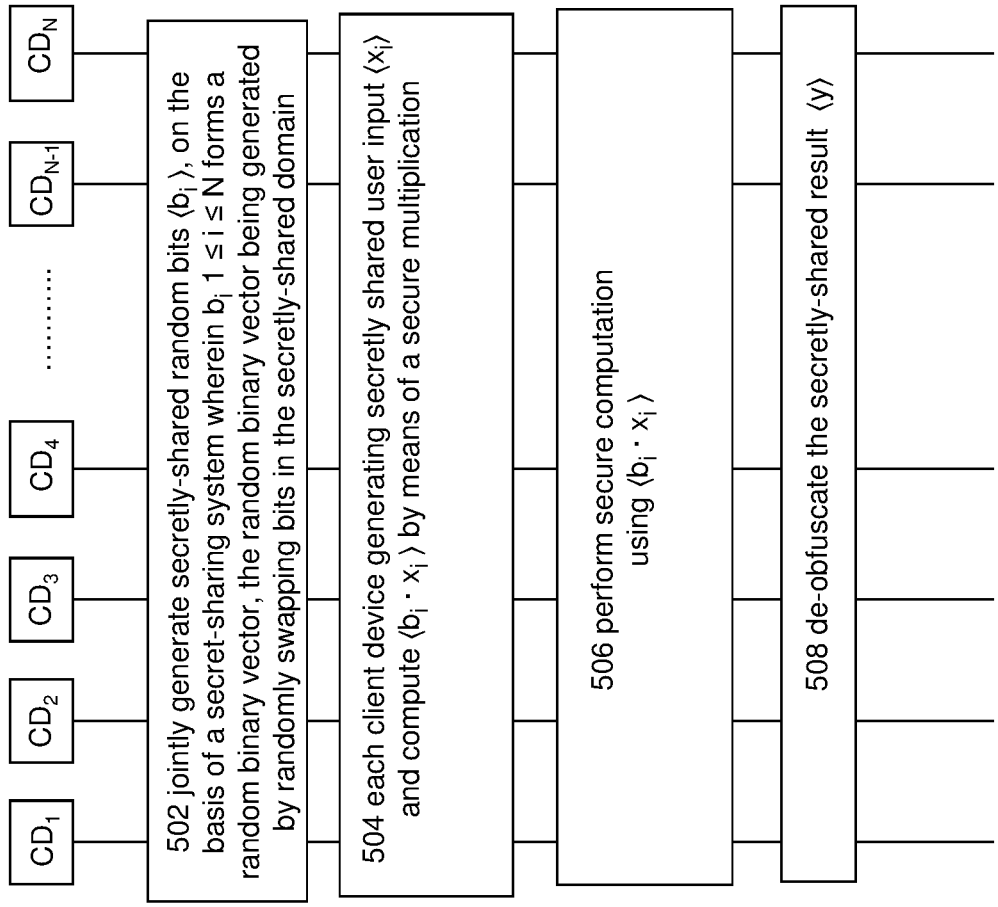
FIG. 5 depicts a method for secure computation of inputs of a randomly selected group of client devices according to yet another embodiment of the invention.

FIG. 5 depicts a method for secure computation of inputs of a randomly selected group of client devices according to yet another embodiment of the invention. In this embodiment, a secret-sharing scheme is used to obfuscate the privacy-sensitive user data and the processing of these user data. In this embodiment, instead of a server, an aggregation server, calculating the aggregated user input, the aggregation may be implemented in a decentralized scheme wherein the aggregation is performed jointly by the client devices. In that case, either a client device or an external device, e.g. a server may trigger the start of the random group selection (step 500). Thereafter, the following steps may be executed:
1. N client devices may jointly generate encrypted random bits $\langle b_i \rangle$, $1 \leq i \leq N$, such that $\Sigma_i b_i = t$ (step 502);
2. client device i may determine a secret-sharing $\langle x_i \rangle$ using the fixed prime p and private share $x_i$, jointly with the other client devices (in the semi-honest model, which is easily achieved by setting the local shares of the other players to zero), and jointly compute $\langle b_i \cdot x_i \rangle$ by means of a secure multiplication (step 504);
3. the secret-shared result $\langle y \rangle$ may be determined based on the shares, e.g. by locally adding the corresponding shares: $y = \Sigma_i x_i b_i$ (step 506).

Such decentralized scheme may also be implemented in the encrypted domain wherein the aggregation calculation $[y] = [\Sigma_i x_i \cdot b_i] = \Pi_i [x_i \cdot b_i]$ may be performed by one or more client devices, or all client devices of the N client devices. In that case, each client device is configured to transmit or broadcast the securely computed products [bi·xi] to the other N−1 client devices in the set. Hence, in case an external device (or one of the client devices) needs the result of the aggregation, the one or more client devices can perform the aggregation calculation, and decrypt the aggregation result.

An advantage of such scheme is that it is no longer necessary to verify the aggregation step performed by the aggregator server. Hence, this way, computations on the secret (and randomised) user data, which is usually done by a central server, may be performed by the client devices. This enables schemes performing all kinds of computations on the user data, without restricting to the homomorphic property of the encryption system.

The systems and methods for privacy-preserving computation of private data as described in this application are particularly useful for implementation in data analytics applications, which require the processing of large amounts of privacy sensitive data. An example of such data analytics application may be a secure privacy-preserving recommender system, wherein a group of participants (voters) may register with the platform, and install an electronic voting application on their computer or mobile device.

The problem of preserving data privacy of users, who repeatedly join the execution of a service with different groups, is present in many data analytics applications requiring multi-party computation, including for example recommendation systems (see Z Erkin, et al, *Generating private recommendations efficiently using homomorphic encryption and data packing*, IEEE Trans. Inform. Forensics Secur. 7(3), 1053-1066, 2012), aggregating data in smart grids, reputation systems (see e.g. J Kacprzyk, *Group decision making with a fuzzy linguistic majority*, Fuzzy Sets Syst, 18, 105-118, 1986), unsupervised machine learning (see e.g. F Anselmi et al., *Unsupervised learning of invariant representations with low sample complexity: the magic of sensory cortex or a new framework for machine learning*? J. Theor. Comput. Sci. 633(C), 112-121 (2016). CBMM, MIT, arXiv: 1311.4158v5), collective decision-making (see e.g. A Mathes, *Folksonomies—cooperative classification and communication through shared metadata*, Comput. Mediated Commun. 47, 1-28, 2004). nr. 10), data clustering (see e.g. Z Erkin et al., in IEEE International Workshop on Information Forensics and Security, *Privacy-preserving user clustering in a social network*, IEEE, Washington, 2009), and social classification (see e.g. H Kargupta et. al, in ICDM, IEEE Computer Society, *On the privacy preserving properties of random data perturbation techniques*, IEEE, Washington, 2003, pp. 99-106). The embodiments in this disclosure can be advantageously used in such data analytics applications to eliminate or at least reduce undesired information leakage and to secure the privacy of users against collusion by malicious users during the execution of such services.

The systems and methods described in this application may be used in any data analytics application that requires an aggregated result (e.g. a sum and/or product) of private data of individual users. For example, possible data analytics applications may include the processing of medical data, e.g. online processing of clinical data or medical records of patients, processing data of voting and secret ballot schemes, processing metrics in television and multimedia applications (e.g. audience ratings of channel usage in television broadcast or streaming applications), processing of financial data of commercial and/or institutional organisations, etc.

Figure 6:
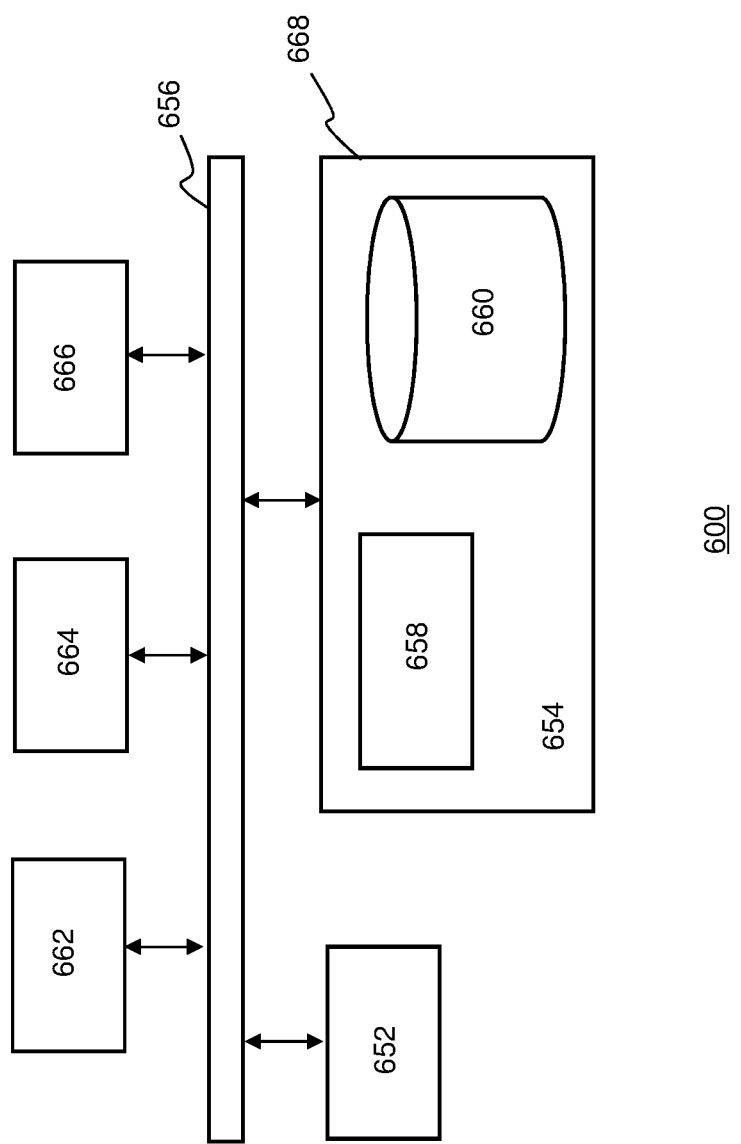
FIG. 6 is a block diagram illustrating an exemplary data computing system that may be used for executing methods and software products described in this disclosure.

FIG. 6 is a block diagram illustrating exemplary data processing systems described in this disclosure. Data processing system 600 may include at least one processor 602 coupled to memory elements 604 through a system bus 606. As such, the data processing system may store program code within memory elements 604. Further, processor 602 may execute the program code accessed from memory elements 604 via system bus 606. In one aspect, data processing system may be implemented as a computer that is suitable for storing and/or executing program code. It should be appreciated, however, that data processing system 600 may be implemented in the form of any system, including a processor and memory, that is capable of performing the functions described within this specification.

Memory elements 604 may include one or more physical memory devices such as, for example, local memory 608 and one or more hulk storage devices 610. Local memory may refer to random access memory, or other non-persistent memory device(s) generally used during actual execution of the program code. A bulk storage device may be implemented as a hard drive or other persistent data storage device. The processing system 600 may also include one or more cache memories (not shown) that provide temporary storage of at least some program code in order to reduce the number of times program code must be retrieved from bulk storage device 610 during execution.

Input/output (I/O) devices depicted as input device 612 and output device 614 optionally can be coupled to the data processing system. Examples of input device may include, but are not limited to, for example, a keyboard, a pointing device such as a mouse, or the like. Examples of output device may include, but are not limited to, for example, a monitor or display, speakers, or the like. Input device and/or output device may be coupled to data processing system either directly or through intervening I/O controllers. A network adapter 616 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 650.

As pictured in FIG. 6, memory elements 604 may store an application 618. It should be appreciated that data processing system 600 may further execute an operating system (not shown) that can facilitate execution of the application. Application, being implemented in the form of executable program code, can be executed by data processing system 600, e.g., by processor 602. Responsive to executing application, data processing system may be configured to perform one or more operations to be described herein in further detail.

In one aspect, for example, data processing system 600 may represent a client data processing system. In that case, application 618 may represent a client application that, when executed, configures data processing system 600 to perform the various functions described herein with reference to a "client". Examples of a client can include, but are not limited to, a personal computer, a portable computer, a mobile phone, or the like.

In another aspect, data processing system may represent a server. For example, data processing system may represent an (HTTP) server in which case application 618, when executed, may configure data processing system to perform (HTTP) server operations. In another aspect, data processing system may represent a module, unit or function as referred to in this specification.

The terminology used herein is for the purpose of describing particular embodiments only, and is not intended to be limiting of the invention. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art, without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for privacy-preserving computation based on inputs of t client devices, the t client devices being randomly selected from a set of N client devices, the method comprising:
   determining, for use by each client device of the set of N client devices, an initial binary vector v of weight t and with length N;
   jointly generating, by the client devices of the set of N client devices, a random binary vector b of weight t and with length N based on the initial binary vector v, the random binary vector b being generated in an obfuscated domain, wherein a bit value $b_i$ at position i in the random binary vector b signals whether a client device i (i=1, . . . , N) of the set of N client devices is selected as one of the t client devices or not and wherein, during the generation of the random binary vector b in the obfuscated domain, random numbers are used to randomly swap bit values at different positions in the initial binary vector v;
   determining, by each client device i of the set of N client devices, a product $b_i \cdot x_i$ of the bit value $b_i$ and an input value $x_i$, the product $b_i \cdot x_i$ being determined in the obfuscated domain;
   transmitting, by each client device i of the set of N client devices, the product $b_i \cdot x_i$ to a server system or to a further client device of the set of N client devices; and,
   performing, by the server system or the further client device, the privacy-preserving computation in the obfuscated domain based on the products $b_i \cdot x_i$ (i=1, . . . , N).

2. The method according to claim 1:
   wherein determining the initial binary vector v of weight t and with length N includes setting the first t bits to one: $v_i=1$, $1 \leq i \leq t$, and all further bits to zero: $v_j=0$, $t<j\leq N$, where $v_i$ is a bit value at position i of the initial binary vector v; and
   wherein generating the random binary vector b of weight t and with length N in the obfuscated domain includes, for each n in in the range {1, . . . , t}:

jointly determining, by the client devices of the set of N client devices, a random number $r_n$ in the range {n, n+1, . . . , N}; and,
using, by each of the client devices of the set of N client devices, the random number $r_n$ to swap bit values at position n and position $r_n$ of the initial binary vector v.

3. The method according to claim 1 wherein the swapping of the bits is based on a delta function $\delta_i^n$, wherein $\delta_i^n=1$ if a value of the random number $r_n=i$, and $\delta_i^n=0$ for all other positions i (i=1, . . . , N) in the initial binary vector v.

4. The method of claim 3 wherein the delta function $\delta_i^n$ is defined based on a Lagrange polynomial function $D_i^n(x)$:

$$D_i^n(x) = \prod_{j=n, j\neq i}^{N} \frac{x-j}{i-j} = \sum_{j=0}^{N-n} d_j x^j$$

wherein $d_j$ represent coefficients of the Lagrange polynomial $D_i^n(x)$.

5. The method according to claim 1 wherein the obfuscated domain is based on a homomorphic cryptosystem.

6. The method according to claim 5, wherein the random binary vector b includes encrypted random bits $[b_i]$, $1 \leq i \leq N$, such that $\Sigma_i b_i = t$; wherein each client device i of the set of N client devices processes its input $x_i$ on the basis of the random binary vector b of encrypted bits by computing an encrypted value $[x_i \cdot b_i] = [b_i]^{x_i}$; and, wherein the privacy-preserving computation in the obfuscated domain is based on the computed encrypted values $[x_i \cdot b_i]$ (i=1, . . . , N).

7. The method according to claim 6, further including:
   transmitting, by each client device i of the set of N client devices, the computed encrypted value $[x_i \cdot b_i]$ to the server system; and,
   performing, by the server system, the privacy-preserving computation on the basis of the computed encrypted values $[x_i \cdot b_i]$ (i=1, . . . , N).

8. The method according to claim 6, further including:
   transmitting, by each client device i of the set of N client devices, the computed encrypted value $[x_i \cdot b_i]$ to the further client device of the set of N client devices; and,
   performing, by the further client devices, the privacy-preserving computation on the basis of the computed encrypted values $[x_i \cdot b_i]$ (i=1, . . . , N).

9. The method according to claim 1 wherein the obfuscated domain is based on a secret-sharing system.

10. The method according to claim 9 wherein the secret-sharing system is based on a modulo computation using a fixed prime p.

11. The method according to claim 10 wherein the random binary vector b includes secret-shared random bits $(b_i)$, $1 \leq i \leq N$, such that $\Sigma_i b_i = t$; wherein each client device i of the set of N client devices determines a secret-shared input value $(x_i)$ using the fixed prime p, and uses secret-shared input value $(x_i)$ to compute a secret-shared value $(x_i \cdot b_i)$; and wherein the privacy-preserving computation in the obfuscated domain is based on the computed secret secret-shared values $(b_i \cdot x_i)$ (i=1, . . . , N).

12. A system for privacy-preserving computation of inputs of t client devices, the t client devices being randomly selected from a set of N client devices, the system comprising:
   a set of client devices i (i=1, . . . , N), each client device comprising a computer readable storage medium having computer readable program code embodied therewith, the program code including an obfuscation function for performing computations in an obfuscated domain, and a processor coupled to the computer readable storage medium, wherein, responsive to executing the computer readable program code the processor is configured to perform executable operations, the executable operations comprising:

determining, for use by each of the client devices of the set of N client devices, an initial binary vector v of weight t and length N;

jointly generating a random binary vector b of weight t and with length N in the obfuscated domain, wherein a bit value $b_i$ at position i in the random binary vector b signals whether the client device i (i=1, ..., N) of the set of N client devices is selected as one of the t client devices or not, the generating including using random numbers to randomly swap bit values at different positions in the initial binary vector v;

determining a product $b_i \cdot x_i$ of the bit value $b_i$, and an input value $x_i$, the product $b_i \cdot x_i$ being determined in the obfuscated domain; and, transmitting the determined product $b_i \cdot x_i$ to a server system or to a further client device of the set of N client devices, wherein the server system or the further client device is configured to perform the privacy-preserving computation in the obfuscated domain based on the products $b_i \cdot x_i$ (i=1, ..., N) determined by each client device i (i=1, ..., N).

13. A client device for use in a system for privacy-preserving computation of inputs of t client devices, the t client devices being randomly selected from a set of N client devices, the client device being associated with an index i, (i=1, ..., N), the client device comprising:

a computer readable storage medium having computer readable program code embodied therewith, the program code including an obfuscation function for performing computations in an obfuscated domain, and a processor coupled to the computer readable storage medium, wherein, responsive to executing the computer readable program code, the processor is configured to perform executable operations, the executable operations comprising:

determining an initial binary vector v of weight t and with length N;

jointly generating a random binary vector b of weight t with length N in the obfuscated domain based on the initial binary vector v, wherein a bit value $b_i$ at position i in the random binary vector b signals whether the client device associated with the index i is selected as one of the t client devices or not, the generating including using random numbers to randomly swap bit values at different positions in the initial binary vector v; and determining a product $b_i \cdot x_i$ of the bit value $b_i$ and an input value $x_i$ in the obfuscated domain.

14. The client device of claim 13 wherein the processor is configured to perform executable operations, the executable operations comprising:

transmitting the determined product $b_i \cdot x_i$ to a server system or to a further client device, wherein the server system or the further client device is configured to perform the privacy-preserving computation in the obfuscated domain on the basis of the products $b_i \cdot x_i$ (i=1, ..., N) determined by each client device i (i=1, ..., N).

15. A method for secure random selection of t client devices from a set of N client devices, the method comprising:

determining an initial binary vector v of weight t and with length N by setting the first t bits to one: $v_i=1$, $1 \leq i \leq t$, and all further bits to zero: $v_i=0$, $t < i \leq N$, where $v_i$ is a bit value at position i of the initial binary vector v;

the client devices of the set of N client devices jointly generating a random binary vector b of weight t in an obfuscated domain based on the initial binary vector v, wherein the bit value $b_i$ signals whether a client device i of the set of N client devices is selected as one of the t client devices or not, the generation of the random binary vector b including, for each position n (1, ..., t) in the initial binary vector v:

the client devices jointly determining a random number $r_n$ in the range $\{n, n+1, ..., N\}$; and, each client device using the random number $r_n$ to swap bit values at position n and position $r_n$ of the initial binary vector v.

16. The method according to claim 15 wherein the swapping of the binary values at positions n and $r_n$ is based on a delta function $\delta_i^n$, wherein $\delta_i^n=1$ if a value of the random number $r_n=i$, and $\delta_i^n=0$ for all other i positions in the initial binary vector v, preferably the delta function $\Delta_i^n$ being defined on the basis of a polynomial function $D_i^n(x)$:

$$D_i^n(x) = \prod_{j=n, j \neq i}^{N} \frac{x-j}{i-j} = \sum_{j=0}^{N-n} d_j x^j$$

wherein $d_j$ represent coefficients of the Lagrange polynomial $D_i^n(x)$.

17. The method according to claim 15 wherein the obfuscated domain is based on a homomorphic cryptosystem and wherein determining a random number $r_n$ further includes:

each client device i generating l random bits $\alpha_1^j$, $0 \leq j < l$, where l is such that $2^{l-1} \leq N-n < 2^l$, each client device i encrypting the random bits $\alpha_1^j$ using the homomorphic cryptosystem;

each client device i computing l encrypted random bits $[\alpha_1^j]$, $0 \leq j < l$, wherein $[\alpha^j]=[\alpha_1^j \oplus \alpha_2^j \oplus ... \oplus \alpha_N^j]$; and each client device i computing an encrypted random number $[r_n]$ on the basis of the encrypted random bits $[\alpha^j]$, preferably the computing including $[r_n]=[\Sigma_{j=0}^{l-1} \alpha^j \cdot 2^j]=\Pi_{j=0}^{l-1}[\alpha_j]^{2^j}$; and determining whether the encrypted random number $[r_n]$ is smaller than or equal to N−n.

18. The method according to claim 15 wherein the obfuscated domain is based on a secret-sharing system, and wherein determining a random number $r_n$ further includes:

each client device i generating l random bits $\alpha_1^j$, $0 \leq j < l$, where l is such that $2^{l-1} \leq N-n < 2^l$, transforming the random bits $\alpha_1^j$ to a secret-shared domain;

the client devices jointly computing l secret-shared random bits $\langle \alpha^j \rangle$, $0 \leq j < l$ wherein $\langle \alpha^j \rangle = \langle \alpha_1^j \oplus \alpha_2^j \oplus ... \oplus \alpha_N^j \rangle$; and each client device i computing the secret-shared random number $\langle r_n \rangle$ on the basis of the secret-shared random bits $\langle \alpha^j \rangle$; and, determining whether the secret-shared random number $\langle r_n \rangle$ is smaller than or equal to N−n.

19. The method according to claim 18 wherein computing the secret-shared random number $\langle r_n \rangle$ on the basis of the secret-shared random bits $\langle \alpha^j \rangle$, includes computing $\langle r_n \rangle = \Sigma_{j=0}^{l-1} \langle \alpha^j \rangle \cdot 2^j$.

* * * * *